(12) United States Patent
Kanayama et al.

(10) Patent No.: US 7,475,007 B2
(45) Date of Patent: Jan. 6, 2009

(54) EXPRESSION EXTRACTION DEVICE, EXPRESSION EXTRACTION METHOD, AND RECORDING MEDIUM

(75) Inventors: Hiroshi Kanayama, Yokohama (JP); Tetsuya Nasukawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 11/061,335

(22) Filed: Feb. 18, 2005

(65) Prior Publication Data

US 2005/0187932 A1 Aug. 25, 2005

(30) Foreign Application Priority Data

Feb. 20, 2004 (JP) .............................. 2004-045342

(51) Int. Cl.
G06F 17/27 (2006.01)
G06F 17/28 (2006.01)

(52) U.S. Cl. ............................... 704/9; 704/7; 704/256; 704/258

(58) Field of Classification Search ...................... 704/7, 704/9, 256, 258
See application file for complete search history.

(56) References Cited

U.S. PATENT DOCUMENTS

| | | | | |
|---|---|---|---|---|
| 5,761,666 | A * | 6/1998 | Sakai et al. | 707/100 |
| 5,963,940 | A * | 10/1999 | Liddy et al. | 707/5 |
| 6,199,034 | B1 * | 3/2001 | Wical | 704/9 |
| 6,233,546 | B1 * | 5/2001 | Datig | 704/7 |
| 6,332,143 | B1 * | 12/2001 | Chase | 707/100 |
| 6,343,266 | B1 * | 1/2002 | Paul et al. | 704/9 |
| 7,289,949 | B2 * | 10/2007 | Warner et al. | 704/9 |
| 2002/0199166 | A1 * | 12/2002 | Volcani et al. | 717/100 |
| 2004/0054534 | A1 * | 3/2004 | Junqua | 704/258 |
| 2005/0131896 | A1 * | 6/2005 | Cao et al. | 707/6 |

(Continued)

OTHER PUBLICATIONS

Vasileios Hatzivassiloglou, et al, "Predicting the semantic orientation of adjectives.", In Proceedings of the 35th Annual Meeting of the ACL and the 8th Conference of the European Chapter of the ACL, p. 174-181, 1997.*

(Continued)

*Primary Examiner*—Vijay B. Chawan
*Assistant Examiner*—Michael C Colucci
(74) *Attorney, Agent, or Firm*—Shimokaji & Associates, P.C.

(57) ABSTRACT

Provided is an expression extraction device for extracting evaluation expressions from text having descriptions on evaluations of a specific evaluation target, which includes a registered expression storage unit for registering an evaluation expression including a predetermined polarity as a registered expression, an expression extraction unit for extracting multiple evaluation expressions and a conjunction expression from the text, a registered expression detection unit for detecting the evaluation expression including the registered expression registered with the registered expression storage unit out of the multiple evaluation expressions, and a polarity judgment unit for judging that the evaluation expression, which is in conjunction with the evaluation expression including the registered expression by means of the conjunction expression in a form of ordinary conjunction, and the series of evaluation expressions, which are not in conjunction with the evaluation expression by means of the conjunction expression in any form of the ordinary conjunction and adversative/concessive conjunction and are not in conjunction with each other by means of the conjunction expression in any form of the ordinary conjunction and the adversative/concessive conjunction, are of the same polarity as the registered expression.

18 Claims, 7 Drawing Sheets

U.S. PATENT DOCUMENTS

2006/0122834 A1* 6/2006 Bennett .................. 704/256
2006/0129927 A1* 6/2006 Matsukawa .............. 715/532

OTHER PUBLICATIONS

Peter Turney, "Thumbs up or Thumbs Down? Semantic Orientation Applied to Unsupervised Classification of Reviews.", In Proceedings of the 40th Annual Meeting of the Association for Computational Linguistics (ACL), p. 417-424, 2002.*

McKeown et. al, "Predicting the Semantic Orientation of Adjectives", Columbia University, 1997, whole document.*

Turney, "Thumbs Up or Thumbs Down? Semantic Orientation Applied to Unsupervised Classification of Reviews", Institute for Information Technology National Research Council of Canada, ACL, Jul. 2002, pp. 417-424.*

Tetsuya Nasukawa, et. al, "Sentiment Analysis: Capturing Favorability Using Natural Language Processing", The Second International Conferences on Knowledge Capture (K-CAP 2003), Oct. 2003.

Jeonghee Yi, et. al, "Sentiment Analyzer: Extracting of Sentiments towards a Given Topic using NLP Techniques", The Third IEEE International Conference on Data Mining (ICDM '03), Nov. 2003.

Bo Pang, et. al, "Thumbs up? Sentiment classification using Machine Learning Techniques.", In Proceedings of the Conference on Empirical Methods in Natural Language Processing (EMNLP), p. 79-86, 2002.

Vasileios Hatzivassiloglou, et al, "Predicting the semantic orientation of adjectives.", In Proceedings of the 35th Annual Meeting of the ACL and the 8th Conference of the European Chapter of the ACL, p. 174-181, 1997.

* cited by examiner

| # | REGISTERED EXPRESSION | POLARITY |
|---|---|---|
| 1 | SATISFIED | ○ |
| 2 | UNSATISFIED | × |
| 3 | USABLE | ○ |
| 4 | PLEASED | ○ |
| 5 | TAKE A LOOK | ○ |
| 6 | RECOMMEND | ○ |
| 7 | SERVE AS + REFERENCE | ○ |
| 8 | BE + ENLIGHTENING | ○ |
| 9 | IMAGE QUALITY + DOWN | × |
| 10 | NOISE + INCREASE | × |
| 11 | TAKE + A LOT OF TROUBLE | × |
| 12 | LIGHTWEIGHT | ○ |
| 13 | INEXPENSIVE | ○ |
| 14 | QUICK | ○ |
| 15 | UNCLEAR | × |

| EVALUATION ITEM | GOOD SENTIMENT | BAD SENTIMENT |
|---|---|---|
| LENS | 71% | 29% |
| | ● · · · | ● · · · |
| | ● · · · | ● · · · |
| BATTERY | 63% | 37% |
| | ● · · · | ● · · · |
| | ● · · · | ● · · · |

EXPRESSION EXTRACTION DEVICE, EXPRESSION EXTRACTION METHOD, AND RECORDING MEDIUM

BACKGROUND OF THE INVENTION

The present invention relates to an expression extraction device, an expression extracting method, a program, and a recording medium. More specifically, the present invention relates to an expression extraction device, an expression extracting method, a program, and a recording medium for extracting evaluation expressions from text having descriptions on evaluations of a specific evaluation target, in which each evaluation expression is an expression indicating the evaluation of the evaluation target.

Along with diffusion of the Internet in recent years, customers and others have started disclosing evaluations of commodities, services, companies themselves, and the like by means of various message boards, evaluation sites, and the like on a network. As a consequence, such information on the network has been highly influential to sentiments of evaluation targets.

Under the circumstances, a sentiment analysis technique is drawing attentions. Here, sentiments are analyzed by acquiring pieces of text describing evaluations of a specific evaluation target such as a commodity, service or company from enormous amounts of information on the network, and then by analyzing those pieces of text (see, Tetsuya Nasukawa, et. al, "Sentiment Analysis: Capturing Favorability Using Natural Language Processing", The Second International Conferences on Knowledge Capture (K-CAP 2003), October 2003, and Jeonghee Yi, et. al, "Sentiment Analyzer: Extracting of Sentiments towards a Given Topic using NLP Techniques", The Third IEEE International Conference on Data Mining (ICDM '03), November 2003 for example).

The sentiment analysis technique extracts the evaluation expressions which represent expressions indicating affirmative evaluations and/or expressions indicating negative evaluations from the text, and then analyzes the sentiments based on extraction results. Conventionally, a dictionary of the evaluation expressions which are the subject of extraction has been produced by manpower. However, the evaluation expressions vary widely and are different depending on the field of the evaluation target. Therefore, it has been difficult to produce such a dictionary including various evaluation expressions in various fields by manpower.

Accordingly, there is also disclosed a technique configured to extract evaluation expressions from text and to register the evaluation expressions with a dictionary after judging whether each of the evaluation expressions belongs to an affirmative expression or a negative expression.

Bo Pang, et. al, "Thumbs up? Sentiment classification using Machine Learning Techniques.", In Proceedings of the Conference on Empirical Methods in Natural Language Processing (EMNLP), p. 79-86, 2002 discloses a method of learning a word strongly correlated with an evaluation value by using data which clearly show whether the entire text is affirmative or negative to the evaluation target, such as a movie review marked with a five-point scale.

Peter Turney, "Thumbs up or Thumbs Down? Semantic Orientation Applied to Unsupervised Classification of Reviews.", In Proceedings of the 40th Annual Meeting of the Association for Computational Linguistics (ACL), p. 417-424, 2002 discloses a method of measuring a negative degree or an affirmative degree of an evaluation expression from degrees of presence of a word such as "poor" or "excellent" in the vicinity of an evaluation expression in a document on the Internet by use of a search engine on the Internet.

Vasileios Hatzivassiloglou, et al, "Predicting the semantic orientation of adjectives.", In Proceedings of the 35th Annual Meeting of the ACL and the 8th Conference of the European Chapter of the ACL, p. 174-181, 1997 discloses a method of learning polarities of words cooccurring in parallel phrases conjoined by a conjunction such as "and", "or", or "but", while defining an affirmative evaluation as a positive polarity and a negative evaluation as a negative polarity. In other words, the method learns the polarities of words such that the words conjoined by "and" or "or" share the same polarity and that the words conjoined by "but" are of the mutually reverse polarities.

With regard to Bo Pang, et. al, "Thumbs up? Sentiment classification using Machine Learning Techniques.", In Proceedings of the Conference on Empirical Methods in Natural Language Processing (EMNLP), p. 79-86, 2002, it is necessary that the entire document be evidently affirmative or negative to the evaluation target. Accordingly, applicable documents are limited.

With regard to Peter Turney, "Thumbs up or Thumbs Down? Semantic Orientation Applied to Unsupervised Classification of Reviews.", In Proceedings of the 40th Annual Meeting of the Association for Computational Linguistics (ACL), p. 417-424, 2002, it is necessary to search the respective evaluation expressions included in the text by use of a search engine. Accordingly, this technique is low in processing efficiency and difficult to obtain an absolute evaluation result due to dependency on the contents of the document subject to searching.

With regard to Vasileios Hatzivassiloglou, et al, "Predicting the semantic orientation of adjectives.", In Proceedings of the 35th Annual Meeting of the ACL and the 8th Conference of the European Chapter of the ACL, p. 174-181, 1997, it is necessary that an evaluation expression as a target for judging a polarity be written as a parallel phase. Therefore, applications of this technique are limited.

SUMMARY OF THE INVENTION

Accordingly, an object of the present invention is to provide an expression extraction device, an expression extracting method, a program, and a recording medium which can solve the foregoing problems. This object will be achieved by a combination of the features described in the independent claims herein. Moreover, the dependent claims herein will define more advantageous examples of the present invention.

According to a first aspect of the present invention, there is provided an expression extraction device for extracting evaluation expressions from text having descriptions on evaluations of a specific evaluation target, in which each evaluation expression is an expression indicating the evaluation of the evaluation target. Here, the expression extraction device includes: a registered expression storage unit for registering an evaluation expression including a predetermined polarity as a registered expression, the polarity being defined as any of a positive polarity representing a positive evaluation and a negative polarity representing a negative evaluation; an expression extraction unit for extracting multiple evaluation expressions and a conjunction expression, which is an expression indicating a conjunctive relation between the evaluation expressions, from the text; a registered expression detection unit for detecting evaluation expressions including the registered expression registered with the registered expression storage unit out of the multiple evaluation expressions; and a polarity judgment unit for judging that the evaluation expression, which is in conjunction with the evaluation expression including the registered expression by means of the conjunction expression in a form of ordinary conjunction, and the series of evaluation expressions, which are not in conjunction with the evaluation expression by means of the conjunction expression in any form of the ordinary conjunction and adversative/concessive conjunction and are not in conjunction with each other by the conjunction expression in any form of the ordinary conjunction and the adversative/concessive conjunction, are of the same polarity as the registered expression. There are also provided an expression extracting method, a program, and a recording medium which are related to the expression extraction device.

It is to be noted that the above-described outline of the invention does not cite all the necessary features of the present invention, and that subcombinations of groups of these features may also constitute the present invention.

According to the present invention, it is possible to extract an evaluation expression indicating an evaluation concerning an evaluation target from text and to judge a polarity appropriately.

BRIEF DESCRIPTION OF THE DRAWINGS

For a more complete understanding of the present invention and the advantage thereof, reference is now made to the following description taken in conjunction with the accompanying drawings.

FIG. 4 shows an example of registered expressions registered in advance with a registered expression storage unit 100 according to the embodiment of the present invention.

FIG. 5 shows an example of evaluation expressions having polarities to be judged by a polarity judgment unit 130 according to the embodiment of the present invention.

FIG. 6 shows an example of the registered expressions registered with the registered expression storage unit 100 according to the embodiment of the present invention.

FIG. 7 shows an example of an evaluation result 700 to be displayed by an evaluation display unit 170 according to the embodiment of the present invention.

DETAILED DESCRIPTION OF THE PREFERRED EMBODIMENT

Now an embodiment of the present invention will be described. It is to be noted, however, that the following embodiment does not limit the scope of the invention as defined in the claims, and that the entire combination of the features described in the embodiment are not always essential as ways to achieve the invention.

Figure 1:
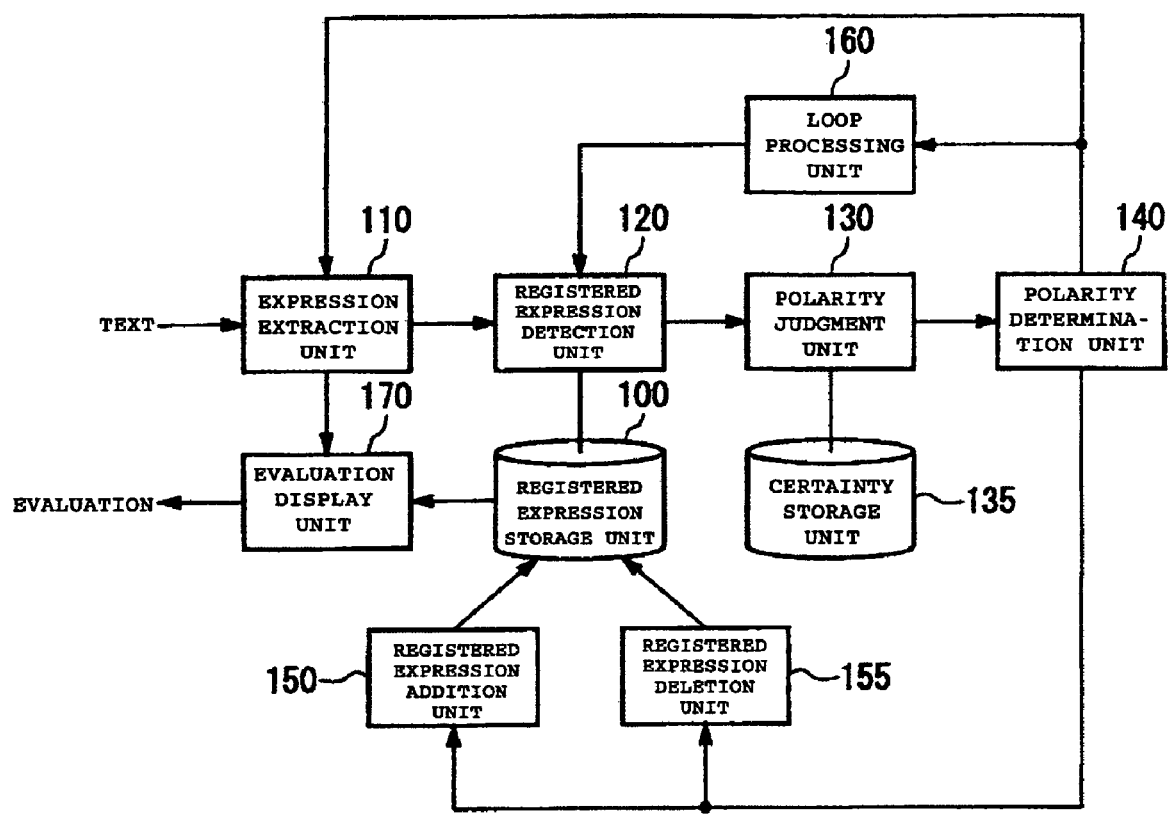
FIG. 1 shows a configuration of an expression extraction device 10 according to an embodiment of the present invention.

FIG. 1 shows a configuration of an expression extraction device 10 according to an embodiment of the present invention. The expression extraction device 10 obtains text describing evaluations concerning a specific evaluation target from the Internet, for example. Then, the expression extraction device 10 extracts evaluation expressions, which are expressions indicating the evaluations of the specific target, from the text and judges polarities of the evaluation expressions. In this text, the evaluation expressions tend to appear continually. Moreover, there are tendencies that an affirmative evaluation expression is located before or after another affirmative expression, and that a negative evaluation expression is located before or after another negative expression. By using such tendencies, the expression extraction device 10 judges a series of evaluation expressions subsequent to an affirmative evaluation expression collectively as affirmative evaluation expressions, and judges a series of evaluation expressions subsequent to a negative evaluation expression collectively as negative expressions.

Meanwhile, if an affirmative evaluation expression is followed by a negative evaluation expression, an adversative/concessive expression such as "but", "however", "while", "in spite of", etc. tends to be inserted therebetween. Accordingly, when there is an adversative/concessive expression between two evaluation expressions, the expression extraction device 10 judges the two evaluation expressions to be of mutually reverse polarities.

The expression extraction device 10 includes a registered expression storage unit 100, an expression extraction unit 110, a registered expression detection unit 120, a polarity judgment unit 130, a certainty storage unit 135, a polarity determination unit 140, a registered expression addition unit 150, a registered expression deletion unit 155, a loop processing unit 160, and an evaluation display unit 170. The registered expression storage unit 100 registered an evaluation expression having a predetermined polarity as a registered expression. In this embodiment, concerning the polarity of the evaluation expression, an affirmative evaluation will be defined as a positive polarity and a negative evaluation will be defined as a negative polarity.

The expression extraction unit 110 obtains text having descriptions of evaluations on a specific evaluation target from the Internet, a file, or the like. Here, the evaluation target is a target such as a commodity, a service or a company to be evaluated by consumers, rating agencies, or the like. Then, the expression extraction unit 110 extracts multiple evaluation expressions and a conjunction expression, which is an expression indicating a conjunctive relation between the evaluation expressions, from the text and outputs the expressions to the registered expression detection unit 120.

Among the multiple evaluation expressions inputted from the expression extraction unit 110, the registered expression detection unit 120 detects evaluation expressions including registered expressions which are registered with the registered expression storage unit 100. Then, the registered expression detection unit 120 outputs the registered expressions included in the detected evaluation expressions and the polarities thereof to the polarity judgment unit 130 together with the evaluation expressions and the conjunction expression inputted from the expression extraction unit 110.

The polarity judgment unit 130 judges the polarities of the respective evaluation expressions based on the evaluation expressions and the conjunction expression extracted by the expression extraction unit 110, and on the evaluation expressions including the registered expressions as well as the polarities of the registered expressions. Here, when a certain evaluation expression appears in multiple positions in the text, the polarity judgment unit 130 individually judges the polarities of the evaluation expression in the respective positions.

The certainty storage unit 135 prestores a certainty, which indicates a degree of the conjunction expression being of an ordinary or adversative/concessive conjunction expression, depending on the type of the conjunction expression. This certainty is predetermined by a registerer or the like who registers the conjunction expression with the expression extraction device 10, and is registered with the certainty storage unit 135. The polarity judgment unit 130 may obtain respective certainties of the conjunction expressions included in the text from the certainty storage unit 135 and judge the polarities of the evaluation expressions further based on the certainties.

The polarity determination unit 140 is inputted the polarities of the evaluation expressions which appear in the multiple positions of the text depending on the positions by the polarity judgment unit 130, and determines the polarities of the evaluation expressions based on these polarities. The registered expression addition unit 150 adds the evaluation expressions having the polarities judged by the polarity judgment unit 130 and determined by the polarity determination unit 140 to the registered expression storage unit 100 as newly registered expressions. When the polarities of the evaluation expressions judged by the polarity judgment unit 130 and determined by the polarity determination unit 140 contradict the polarities of the registered expressions corresponding to the evaluation expressions registered with the registered expression storage unit 100, the registered expression deletion unit 155 deletes the registered expressions from the registered expression storage unit 100. In this way, the registered expression deletion unit 155 can maintain correct polarities of the registered expressions in the registered expression storage unit 100.

The loop processing unit 160 allows the registered expression detection unit 120, the polarity judgment unit 130, the polarity determination unit 140, the registered expression addition unit 150, and the registered expression deletion unit 155 to repeat the processing based on the registered expression storage unit 100 to which the newly registered expressions are added by the registered expression addition unit 150. In this way, the expression extraction device 10 can judge and determine evaluation expressions having polarities, which could not be judged and determined as a result of the processing using the registered expressions being previously registered, by using the newly added registered expressions instead.

The evaluation display unit 170 reads the multiple evaluation expressions having the polarities determined by the polarity determination unit 140 out of the registered expression storage unit 100, and displays the evaluation of the evaluation target based on the polarities of the multiple evaluation expressions. As the expression extraction device 10 includes the evaluation display unit 170, the expression extraction device 10 functions as a sentiment analysis device for analyzing a sentiment of the evaluation target based on the inputted text.

Figure 2:
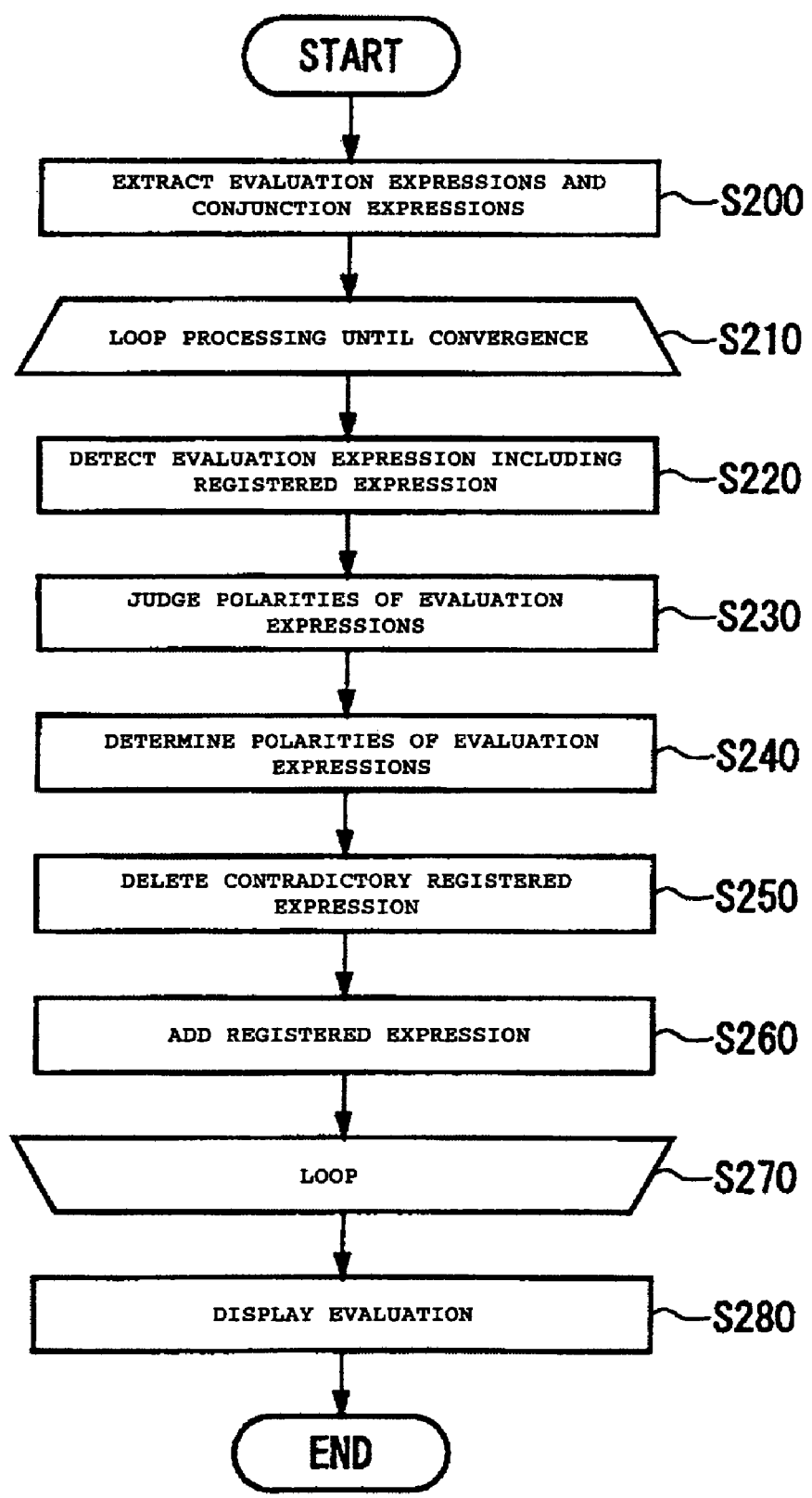
FIG. 2 shows an operational flow of the expression extraction device 10 according to the embodiment of the present invention.

FIG. 2 shows an operational flow of the expression extraction device 10 according to this embodiment.

Firstly, the expression extraction unit 110 obtains the text including the evaluations of the specific evaluation target written in a natural language, and then extracts the multiple evaluation expressions and the conjunction expression from the text (Step S200). To be more precise, the expression extraction unit 110 analyzes sentence structures of the text and thereby extracts sentences, phrases, verbs/adjectives, and the like as the evaluation expressions.

Then, the loop processing unit 160 repeats processing from Step S220 to Step S260 until convergence of judgments of each polarity concerning the respective evaluation expressions extracted from the text (Steps S210 and S270).

In the loop processing, the registered expression detection unit 120 detects the evaluation expressions including the registered expressions registered with the registered expression storage unit 100, from the multiple evaluation expressions (Step S220).

Next, the polarity judgment unit 130 judges the polarities of the respective evaluation expressions (Step S230). To be more precise, the polarity judgment unit 130 judges that the evaluation expression, which is in conjunction with the evaluation expression including the registered expression by means of the conjunction expression in a form of ordinary conjunction, and a series of evaluation expressions, which are not in conjunction with the evaluation expression by means of the conjunction expression in any form of the ordinary conjunction and adversative/concessive conjunction and are not in conjunction with each other by the conjunction expression in any form of the ordinary conjunction and the adversative/concessive conjunction, are of the same polarity as the registered expression.

In other words, for example, when an evaluation expression A including the registered expression, an ordinary conjunction expression B, an evaluation expression C, an evaluation expression D, an evaluation expression E, and an evaluation expression F are arranged in this order, the polarity judgment unit 130 judges that the evaluation expression C which is in conjunction with the evaluation A by use of the ordinary conjunction expression B is of the same polarity as the registered expression. Moreover, the polarity judgment unit 130 judges that the series of evaluation expressions D, E, and F, which are not in conjunction with the evaluation expression C by means of the conjunction expression in any form of the ordinary conjunction and the adversative/concessive conjunction and are not in conjunction with one another by the conjunction expression in any form of the ordinary conjunction and the adversative/concessive conjunction, are of the same polarity as the registered expression.

Meanwhile, the polarity judgment unit 130 judges that the evaluation expression, which is in conjunction with the evaluation expression including the registered expression by means of the conjunction expression in a form of adversative/concessive conjunction, and a series of evaluation expressions, which are not in conjunction with the evaluation expression by means of the conjunction expression in any form of the ordinary conjunction and adversative/concessive conjunction and are not in conjunction with each other by the conjunction expression in any form of the ordinary conjunction and the adversative/concessive conjunction, are of a reverse polarity to the registered expression.

In other words, for example, when an evaluation expression A including the registered expression, an adversative/concessive conjunction expression B, an evaluation expression C, an evaluation expression D, an evaluation expression E, and an evaluation expression F are arranged in this order, the polarity judgment unit 130 judges that the evaluation expression C, which is in conjunction with the evaluation A by use of the adversative/concessive conjunction expression B, is of the reverse polarity to the registered expression. Moreover, the polarity judgment unit 130 judges that the series of evaluation expressions D, E, and F, which are not in conjunction with the evaluation expression C by means of the conjunction expression in any form of the ordinary conjunction and the adversative/concessive conjunction and are not in conjunction with one another by the conjunction expression in any form of the ordinary conjunction and the adversative/concessive conjunction, are of the reverse polarity to the registered expression.

The polarity judgment unit 130 performs the above-described judgment processes for the evaluation expressions which are positioned after the evaluation expression including the registered expression within the text, and may perform the identical processes for the evaluation expressions which are positioned before the evaluation expression including the registered expression within the text as well. Meanwhile, the polarity judgment unit 130 may firstly judge the polarity of the evaluation expression C conjoined with the evaluation expression A by the conjunction expression B, then judge the polarity of the evaluation expression D adjacent to the evaluation expression C registered with the registered expression storage unit 100 as the registered expression in the next loop, and then judge the evaluation expression E adjacent to the evaluation expression D registered with the registered expression storage unit 100 as the registered expression in the next loop thereafter. In this case, the polarity judgment unit 130 may sequentially select each of the series of evaluation expressions not in conjunction with one another by the conjunction expression in any form of the ordinary conjunction and the adversative/concessive conjunction in each loop and thereby sequentially judge the evaluation expressions as the same polarity.

Here, in the processing in Step S230, the polarity judgment unit 130 may perform the above-described judgment of the polarity on the condition that the evaluation expressions do not include any of the registered expressions. In this way, the polarity judgment unit 130 can prevent repetitive judgments of the registered expression registered with the registered expression storage unit 100 as a result of a previous judgment of the polarity. Accordingly, it is possible to reduce time required for convergence of the judgments of the polarity concerning each of multiple evaluation targets.

Meanwhile, in the processing in Step S230, the polarity judgment unit 130 may further judge certainties of the polarities of the evaluation expressions, which is in conjunction with the evaluation expression including the registered expression by means of the conjunction expression in any form of the ordinary conjunction and the adversative/concessive conjunction, and of the series of evaluation expressions, which are not in conjunction with the evaluation expression by means of the conjunction expression in any form of the ordinary conjunction and adversative/concessive conjunction and are not in conjunction with each other by the conjunction expression in any form of the ordinary conjunction and the adversative/concessive conjunction, based on the certainty of the ordinary conjunction expression.

In other words, for example, a conjunction "but" which represents an example of the conjunction expression never becomes the ordinary conjunction. Accordingly, the certainty storage unit 135 holds a high value for the certainty that the conjunction "but" is the adversative/concessive conjunction expression. Meanwhile, a conjunction "while" as another example of the conjunction expression may become the ordinary conjunction. For example, the word "while" in the following sentence "While I heard good reputation of the product, it was actually disappointing." is the adversative/concessive conjunction. On the contrary, the word "while" in the following sentence "It was actually true, while I heard good reputation of the product." is the ordinary conjunction. Therefore, the certainty storage unit 135 holds a lower value for the certainty that the conjunction "while" is the adversative/concessive conjunction expression as compared to the conjunction "but". In this way, the polarity judgment unit 130 can judge that the certainty of the evaluation expression in conjunction with the evaluation expression of the positive polarity by the word "but" is of the negative polarity at a higher rate than the certainty of the evaluation expression in conjunction with the evaluation expression of the positive polarity by the word "while" to be of the negative polarity.

Next, the polarity determination unit 140 determines the polarities of the evaluation expressions based on the respective polarities of the evaluation expressions appearing in the multiple positions in the text (Step S240). To be more precise, when the polarities of the evaluation expression in the respective positions which appears in the multiple positions in the text are judged to be of the same polarity at a rate equal to or higher than a predetermined proportion, the polarity determination unit 140 determines the polarity of the relevant verb/adjective to be of the same polarity at the rate equal to or higher than the predetermined proportion.

Alternatively, the polarity determination unit 140 may determine the polarity of the single evaluation expression appearing in the multiple positions in the text further based on the certainties of the polarities in the respective positions. In other words, for example, the polarity determination unit 140 weights the polarities of the evaluation expression in the respective positions which appears in the multiple positions in the text depending on the certainties of the polarities, and then determines the polarity of the evaluation expression based on the weighted polarities. For instance, when there are sentences "A (the positive polarity), while B." and "C (the negative polarity), but B." in the text, the polarity judgment unit 130 judges the evaluation expression B as the negative polarity (with a low certainty) based on the former sentence and then judges the evaluation expression B as the positive polarity (with a high certainty) based on the latter sentence. As a result, the polarity determination unit 140 can determine the evaluation expression B as the positive polarity based on these certainties.

Next, when the evaluation expression having the polarity judged by the polarity judgment unit 130 is registered with the registered expression storage unit 100 as the registered expression and when the polarities of the evaluation expression and of the registered expression are mutually different, the registered expression deletion unit 155 deletes the registered expression from the registered expression storage unit 100 (Step S250). Here, the registered expression deletion unit 155 may delete the registered expression from the registered expression storage unit 100 when the polarities of the single evaluation expression in positions equal to or more than a predetermined proportion of the polarities of the single evaluation expression in the respective positions which appears in the multiple positions in the text are judged as different from the polarity of the registered expression included in the single evaluation expression registered with the registered expression storage unit 100. Here, this proportion may be the same as or different from the proportion used for determination of the polarity by the polarity determination unit 140.

Next, the registered expression addition unit 150 adds the evaluation expression having the polarity judged by the polarity judgment unit 130 and determined by the polarity determination unit 140 to the registered expression storage unit 100 as a newly registered expression (Step S260).

The loop processing unit 160 repeats the processing from Step S220 to Step S260 until convergence of judgments of the polarities concerning the respective evaluation expressions (Steps S210 and S270). That is, the loop processing unit 160 repeats the processing from Step S220 to Step S260 when the polarity of any of the evaluation expressions is newly determined or changed in the course of the previous processing from Step S220 to Step S260.

Thereafter, the evaluation display unit 170 reads the multiple evaluation expressions registered having the polarities determined by the polarity determination unit 140 and registered with the registered expression storage unit 100 by the registered expression addition unit 150, and the polarities thereof from the registered expression storage unit 100, and then displays the evaluation of the evaluation target based on the polarities of the multiple evaluation expressions (S280).

According to the above-described expression extraction device 10, it is possible to determine the respective polarities of the multiple evaluation expressions included in the text appropriately and register as registered expressions by use of the aspects that an evaluation expression of an identical polarity tends to be located before or after a certain evaluation expression, and that an adversative/concessive conjunction expression tends to be inserted when an affirmative evaluation expression and a negative evaluation expression are located close to each other. As a result, the expression extraction device 10 can perform the sentiment analysis more properly based on the registered expressions which are effectively extracted and registered.

Figure 3:
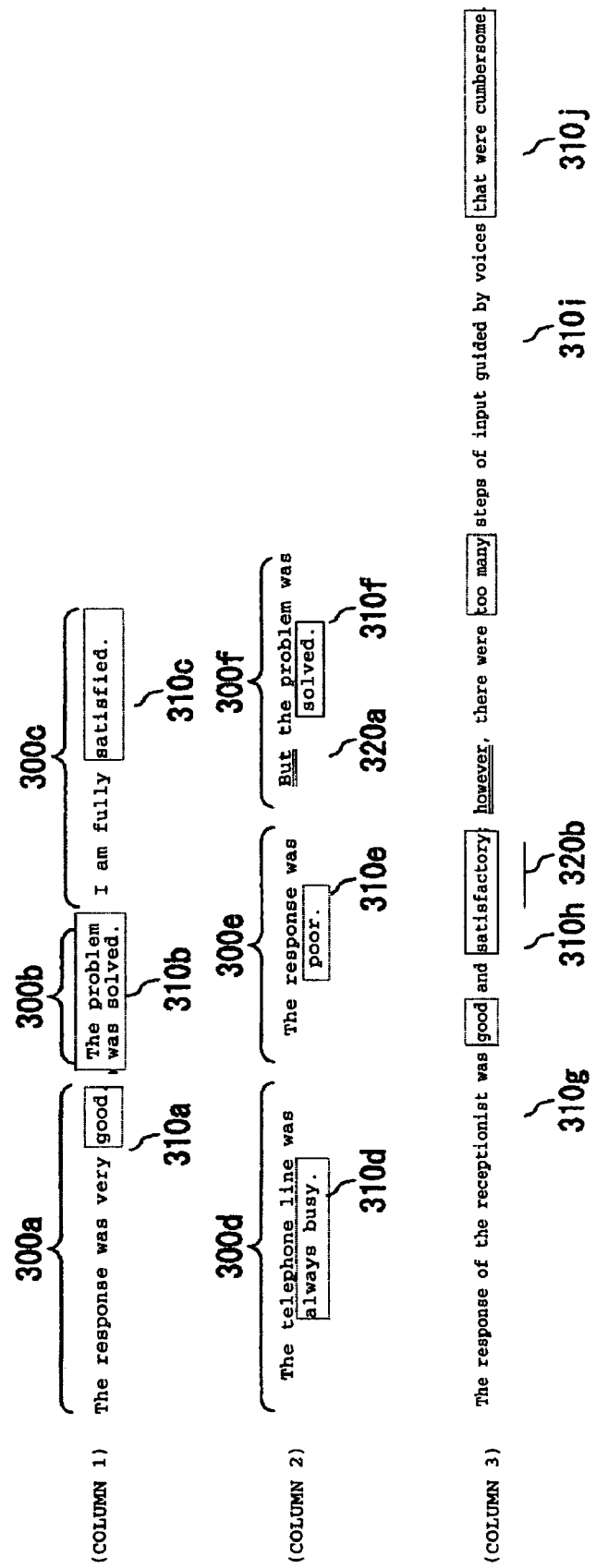
FIG. 3 shows an example of text subject to processing by the expression extraction device 10 according to the embodiment of the present invention.

FIG. 3 shows an example of text subject to processing by the expression extraction device 10 of this embodiment. The expression extraction device 10 of this embodiment performs the processing while extracting expressions on a sentence basis or a phrase basis as the evaluation expressions.

(1) Processing on a Sentence Basis

A column 1 and a column 2 in FIG. 3 show an example of the processing on a sentence basis. In the processing on a sentence basis, the expression extraction unit 110 extracts at least part of multiple sentences included in the text respectively as the multiple evaluation expressions. Meanwhile, the expression extraction unit 110 extracts conjunctions respectively added to the multiple sentences as the conjunction expressions.

For example, the column 1 in FIG. 3 includes three sentences 300a to 300c, namely, "The response was very good.", "The problem was solved.", and "I am fully satisfied." The expression extraction unit 110 extracts evaluation expressions 310a to 310c which respectively constitute verb phrases of these multiple sentences. Meanwhile, since the sentences 300a to 300c are not conjoined with one another by an ordinary conjunction or an adverse/concessive conjunction, the expression extraction unit 110 does not extract any conjunction concerning the column 1.

Here, when the evaluation expression 310c is registered with the registered expression storage unit 100 as the registered expression of the positive polarity, the polarity judgment unit 130 judges the evaluation expressions 310a and 310b included in the series of sentences 300a and 300b, which are not in conjunction with the sentence 300c including the evaluation expression 310c as the registered expression by any of an ordinary conjunction and an adversative/concessive conjunction and are not in conjunction with each other by a conjunction in any form of ordinary conjunction and adversative/concessive conjunction, are of the positive polarity as the same as the polarity of the evaluation expression 310c. Similarly, the polarity judgment unit 130 judges that the evaluation expressions included in the series of sentences which are not in conjunction with a sentence including the evaluation expression as the registered expression of the negative polarity by any of an ordinary conjunction and an adversative/concessive conjunction and are not in conjunction with each other by a conjunction in any form of ordinary conjunction and adversative/concessive conjunction, are of the negative polarity as the same as the polarity of the registered expression. As a result, the polarity judgment unit 130 can correctly judge the two evaluation expressions of "was good" and "was solved" as the affirmative evaluation expressions.

Meanwhile, the column 2 in FIG. 3 includes three sentences 300d to 300f, namely, "The telephone line was always busy.", "The response was poor.", and "But, the problem was solved." The expression extraction unit 110 extracts evaluation expressions 310d to 310f which respectively constitute verb phrases of these multiple sentences. Meanwhile, the sentence 300e is conjoined with the sentence 300f by a conjunction expression 320a which is an adversative/concessive conjunction. Accordingly, the expression extraction unit 110 extracts the conjunction expression 320a.

Here, when the evaluation expression 310f is registered with the registered expression storage unit 100 as the registered expression of the positive polarity, the polarity judgment unit 130 judges the evaluation expression 310e included in the sentence 300e which is in conjunction with the sentence 300f including the evaluation expression 310f as the registered expression by the adversative/concessive conjunction 320a, and the evaluation expression 310d included in a series of sentences 300d which is not in conjunction with the sentence 300e by any of an ordinary conjunction and an adversative/concessive conjunction and is not in conjunction with each other by a conjunction in any form of ordinary conjunction and adversative/concessive conjunction, are of the reverse polarity to the polarity of the registered expression. Similarly, the polarity judgment unit 130 judges that the evaluation expressions included in the sentence which is in conjunction with the sentence including the evaluation expression as the registered expression by an ordinary conjunction, and the evaluation expressions included in the series of sentences not in conjunction with the sentence including the evaluation expression as the registered expression by any of an ordinary conjunction or an adversative/concessive conjunction and not in conjunction with each other by a conjunction in any form of ordinary conjunction and adversative/concessive conjunction, are of the same polarity as the polarity of the registered expression. As a result, the polarity judgment unit 130 can correctly judge the two evaluation expressions of "was always busy" and "was poor" as the negative evaluation expressions.

Here, when the sentences contained in the text include two or more phrases, the expression extraction unit 110 may extract each phrase constituting a main element of each of the multiple sentences contained in the text as each of the multiple evaluation expressions. Here, the phrase constituting the main element of the sentence is a phrase constituting a main part of the content expressed in the sentence having the multiple phrases. In Japanese, such a phrase is located at the end of the sentence.

Moreover, the polarity judgment unit 130 may judge the evaluation expression constituting the main element of the sentence in conjunction with the sentence including the main element having the evaluation expression as the registered expression by any of an ordinary or adversative/concessive conjunction expression, and the evaluation expressions of the main elements in the series of sentences which are not in conjunction with the sentence including the evaluation expression constituting the main element by a conjunction expression in any form of ordinary conjunction or adversative/concessive conjunction and are not in conjunction with each other by a conjunction expression in any form of ordinary conjunction or adversative/concessive conjunction, are of the polarity which is the same as or reverse to the polarity of the registered expression.

Alternatively, the expression extraction unit 110 may extract at least a part of a sentence among the respective sentences contained in the text which does not satisfy a predetermined excluding condition as each of the multiple evaluation expressions. This excluding condition may be an aspect that the sentence is judged as an interrogative sentence as a result of the sentence structure analysis by the expression extraction unit 110, or an aspect that the sentence is judged as a sentence expressing an intention, for example. In this way, the expression extraction unit 110 can exclude sentences which do not describe objective evaluations from targets for extracting the evaluation expressions.

(2) Processing on a Phrase Basis

A column 3 in FIG. 3 shows an example of the processing on a phrase basis. In the processing on a phrase basis, the expression extraction unit 110 of this embodiment extracts main verbs/adjectives of respective phrases constituting a sentence included in the text as multiple evaluation expressions. Moreover, the expression extraction unit 110 extracts conjunction expressions inserted between the multiple phrases, such as conjunctions and conjunctive particles.

For example, the column 3 in FIG. 3 includes four evaluation expressions 310g to 310j, namely, a main verb/adjective "was good" in a phrase "The response of a receptionist was good", a verb/adjective "was satisfactory", a main verb/adjective "were too many" in a phrase "there were too many steps of input guided by voices", and a verb/adjective "were cumbersome". The expression extraction unit 110 extracts the evaluation expressions 310g to 310j and a conjunction expression 320b which is a conjunction.

Here, when the evaluation expression 310h is registered with the registered expression storage unit 100 as the registered expression of the positive polarity, the polarity judgment unit 130 judges that the evaluation expression 310i of the phrase in conjunction with the phrase including the evaluation expression 310h as the registered expression by the adversative/concessive conjunction expression 320b, and the evaluation expression 310j of the phrase not in conjunction with the phrase including the evaluation expression 310i by a conjunction expression in any form of ordinary conjunction and adversative/concessive conjunction and are not in conjunction within 310j by a conjunction in any form of ordinary conjunction and adversative/concessive conjunction, are of the reverse polarity to the polarity of the registered expression. Similarly, the polarity judgment unit 130 judges that a verb/adjective of a phrase in conjunction with the phrase including the registered expression by an ordinary conjunction expression, and verbs/adjectives of a series of phrases, which are not in conjunction with the foregoing phrase by a conjunction expression in any form of ordinary conjunction and adversative/concessive conjunction and are not in conjunction with each other by a conjunction expression in any form of ordinary conjunction and adversative/concessive conjunction, are of the same polarity to the polarity of the registered expression. As a result, the polarity judgment unit 130 can correctly judge the two evaluation expressions of the verbs/adjectives "were too many" and "were cumbersome" as the negative evaluation expressions.

Meanwhile, the polarity judgment unit 130 judges that the evaluation expression 310g, which is the verb/adjective of the phrase not in conjunction with the phrase including the evaluation expression 310h as the registered expression by a conjunction expression in any form of ordinary conjunction and adverse/concessive conjunction, is of the same polarity as the polarity of the evaluation expression 310h. As a result, the polarity judgment unit 130 can correctly judge the verb/adjective "was good" as the affirmative evaluation expression.

FIG. 4 shows examples of the registered expressions registered in advance with the registered expression storage unit 100 of this embodiment. As clues for judging the polarities of the evaluation expressions, the registered expression storage unit 100 of this embodiment stores the expressions, which can clearly define the polarities of the evaluation expressions not depending on contexts and technical terms, in advance while linking with the polarities of the expressions. The registered expression storage unit 100 of this embodiment registers an expression "satisfied" of the positive polarity (indicated by "○" in the table) and an expression "unsatisfied" of the negative polarity (indicated by "x" in the table) in advance.

FIG. 5 shows examples of the evaluation expressions having the polarities judged by the polarity judgment unit 130 of this embodiment. In this table, the evaluation expressions extracted from the text describing an evaluation of a digital camera are shown as the examples. The polarities of the evaluation expressions in the text are judged by use of the registered expressions registered with the registered expression storage unit 100 by the processing from Steps S220 and S230 in FIG. 2, and are determined in the processing in Step S240.

For example, an evaluation expression "think" appears 125 (=91+34) times in the text. Here, the polarity judgment unit 130 judges 91 times appearance thereof as the positive polarity and 34 times appearance thereof as the negative polarity. Similarly, concerning another evaluation expression "do", the polarity judgment unit 130 judges 78 times appearance thereof as the positive polarity and 39 times appearance thereof as the negative polarity.

Meanwhile, the expression extraction unit 110 may further extract a pair including an evaluation item and an expression indicating an evaluation of the evaluation item at least as one of the multiple evaluation expressions. In other words, for example, the expression extraction unit 110 may further extract a pair of "serve as+reference" which includes an evaluation item "reference" and an expression "serve as" indicating an evaluation of the "reference". Similarly, the expression extraction unit 110 may further extract a pair of "take+a lot of trouble" which includes an evaluation item "a lot of trouble" and an expression "take" indicating an evaluation of the "a lot of trouble".

To be more precise, the expression extraction unit 110 may extract a pair of a verb/adjective indicating an evaluation of the evaluation item and its argument which indicates the evaluation item expressed as subject, object, or prepositional phase. In other words, for example, the expression extraction unit 110 may extract the pair of the case "battery" indicating the evaluation item and the verb/adjective "last long" indicating the evaluation of the "battery" and thereby form the evaluation expression "battery+lasts long".

The expression extraction device 10 judges and determines the polarities of the evaluation expressions composed of the above-described pairs similarly. In this way, concerning a verb/adjective such as "be large" which is used in an affirmative sense as well as a negative sense and does not exhibit a uniform polarity in multiple positions, it is possible to determine the polarity of the verb/adjective together with its case by defining "effect is large" as an affirmative evaluation expression and "noise is large" as a negative evaluation expression, for example.

As described above, the polarity judgment unit 130 and the polarity determination unit 140 may be configured to firstly judge and determine the polarity only with the verb/adjective and then in the case of difficulty to judge and determine the polarity of the verb/adjective by itself it is possible to judge and determine the polarity of the verb/adjective in the form including its case.

To be more precise, when a single verb/adjective appearing in multiple positions in the text is judged to have identical polarities in the respective positions at a proportion equal to or higher than a predetermined proportion, such as a proportion of 90%, the polarity determination unit 140 determines the polarity of the verb/adjective to be equivalent to the polarity judged as identical at the proportion equal to or higher than the predetermined proportion. For example, since an evaluation expression "lightweight" shown in the table is judged as the positive polarity at a proportion equal to or higher than 90%, the polarity determination unit 140 determines the evaluation expression as the positive polarity. In this case, the polarity determination unit 140 may determine the polarity on the condition that appearance of the verb/adjective in the text reaches a predetermined frequency of 10 times or higher, for example.

Meanwhile, when the polarities in the respective positions of the single verb/adjective appearing in the multiple positions in the text are not judged to have the identical polarity at a proportion equal to or higher than the predetermined proportion, the polarity determination unit 140 instructs the expression extraction unit 110 to extract a new evaluation expression composed of a pair of the relevant verb/adjective and a noun qualified by the verb/adjective. Upon receipt of the instruction, the expression extraction unit 110 extracts new evaluation expressions such as "serve as+reference", "take+a lot of trouble", or "battery+lasts long". Next, the polarity judgment unit 130 judges the polarities of the new evaluation expressions. Thereafter, when the new evaluation expression appearing in the multiple positions in the text is judged to have an identical polarity at a proportion equal to or higher than the predetermined proportion of 90%, for example, the polarity determination unit 140 determines the polarities judged to be identical at the proportion equal to or higher than the predetermined proportion as the polarity of the new evaluation expression. For example, since the evaluation expressions "serve as+reference" and "battery+lasts long" are judged to have the positive polarity at proportions equal to or higher than 90% as shown in the table, the polarity determination unit 140 determines the evaluation expressions as the positive polarity. Meanwhile, since the evaluation expression "take+a lot of trouble" is judged to have the negative polarity at a proportion equal to or higher than 90%, the polarity determination unit 140 determines the evaluation expression as the negative polarity. In this case, the polarity determination unit 140 may determine the polarity on the condition that appearance of the verb/adjective in the text reaches a predetermined frequency of 3 times or higher, for example. Such a frequency may be set to a smaller value than a lower limit of a frequency of independent appearance of the verb/adjective.

As a result of the above-described processing, the registered expression addition unit 150 can register the respective evaluation expression such as "serve as+reference", "lightweight", "take+a lot of trouble", and "battery+lasts long" with the registered expression storage unit 100 as the registered expressions.

FIG. 6 shows examples of the registered expressions registered with the registered expression storage unit 100 of this embodiment. As a result of the loop processing from Step S220 to Step S260, the expression extraction device 10 can register various registered expressions and the polarities thereof in addition to the registered expressions "satisfied" and "unsatisfied" as shown in the table, for example.

FIG. 7 shows an example of an evaluation result 700 to be displayed by the evaluation display unit 170 of this embodiment. The evaluation display unit 170 reads the multiple evaluation expressions, which have the polarities determined by the polarity determination unit 140 and are registered with the registered expression storage unit 100 by the registered expression addition unit 150, and the polarities out of the registered expression storage unit 100 and then analyzes the evaluation of the evaluation target based on the polarities of the multiple evaluation expressions. Thereafter, the evaluation display unit 170 displays an analysis result of the evaluation of the evaluation target.

The evaluation display unit 170 inputs the registered expressions registered with the registered expression storage unit 100 in the processing from Step S200 to S270 shown in FIG. 2 and the text describing the evaluation of the evaluation target, and performs a sentiment analysis on the evaluation target. Here, the evaluation display unit 170 may perform the sentiment analysis in terms of the text subject to extraction of the registered expressions or perform the sentiment analysis in terms of newly inputted text instead.

Concerning the multiple evaluation items on the evaluation target, the evaluation display unit 170 of this embodiment displays the number and/or the proportion of the affirmative evaluations (good sentiments) and the number and/or the proportion of the negative evaluations (bad sentiments) on the respective evaluation items while linking the affirmative evaluations with the negative evaluations thereof. Moreover, in addition to the number and/or the proportion of the affirmative evaluations or the negative evaluations, the evaluation display unit 170 displays the evaluation expressions indicating the affirmative evaluations or the negative evaluations in terms of the respective evaluation items.

Here, the evaluation display unit 170 selects the noun in the evaluation expression composed of the pair of the case and the verb/adjective as the evaluation item to be displayed as the evaluation result 700. In other words, for example, the evaluation display unit 170 the "battery" in the evaluation expression "battery+lasts long" as the evaluation item.

Meanwhile, the evaluation display unit 170 may select a subject corresponding to the evaluation expression composed of a verb phrase and a verb/adjective as the evaluation item to be displayed as the evaluation result 700. In other words, for example, concerning the sentence 300a "The response was very good." in the column 1 in FIG. 3, the subject "response" corresponding to the evaluation expression 310a may be selected as the evaluation item to be displayed as the evaluation result 700.

According to the above-described expression extraction device 10, it is possible to obtain text concerning a specific evaluation target from the Internet or the like, to extract evaluation expressions without manpower, and to register the evaluation expression with the registered expression storage unit 100. Hence, the expression extraction device 10 can perform a sentiment analysis based on the registered evaluation expressions. In this way, it is possible to reduce costs for producing a dictionary of the evaluation expressions and thereby to perform a sentiment analysis efficiently.

Figure 8:
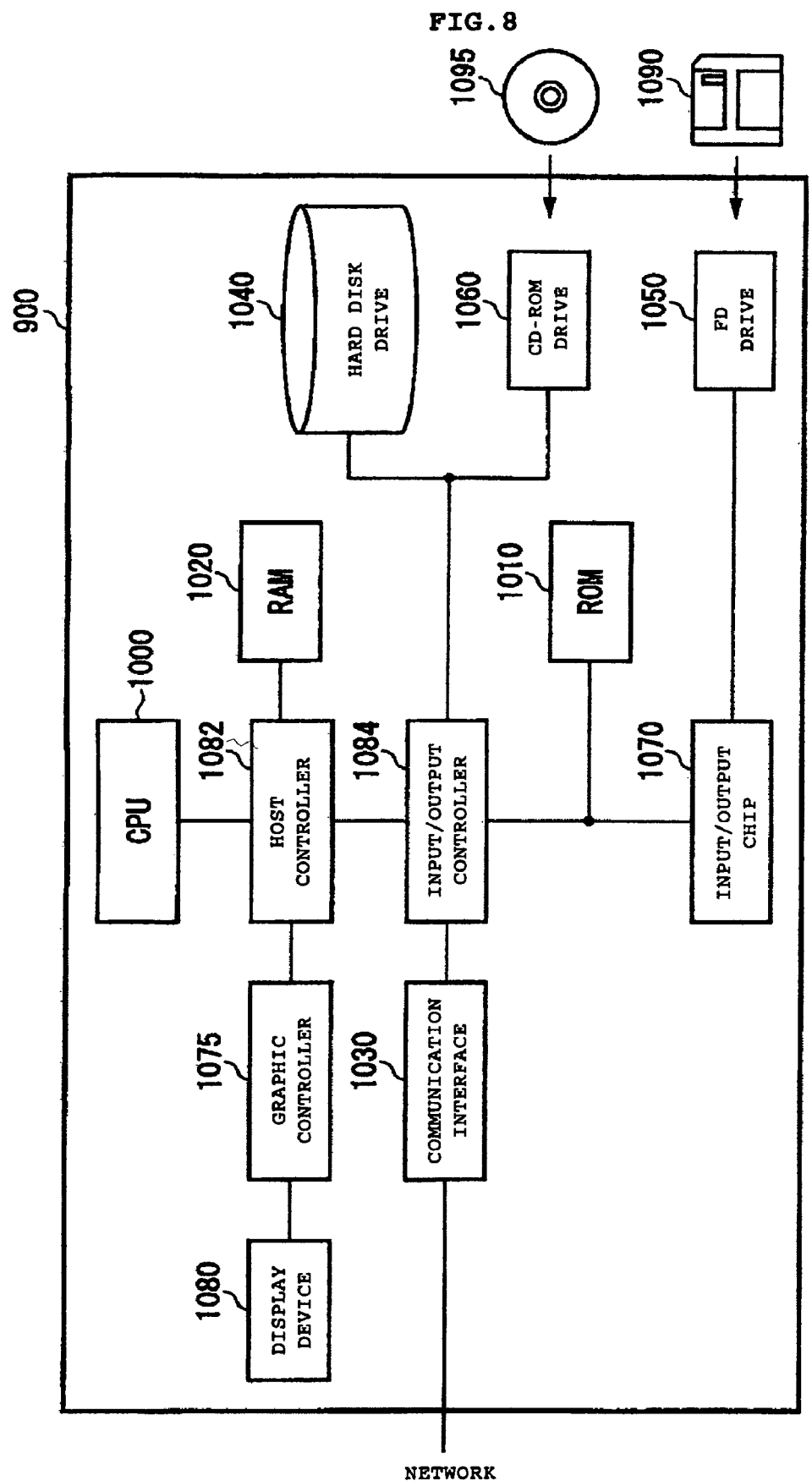
FIG. 8 shows an example of a hardware configuration of a computer 900 according to the embodiment of the present invention.

FIG. 8 shows an example of a hardware configuration of a computer 900 of this embodiment. The computer 900 of this embodiment includes: a CPU peripheral unit having a CPU 1000, a RAM 1020, a graphic controller 1075, and a display device 1080 which are mutually connected by a host controller 1082; an input/output unit having a communication interface 1030, a hard disk drive 1040, and a CD-ROM drive 1060 which are connected to the host controller 1082 by an input/output controller 1084; and a legacy input/output unit having ROM 1010, a FD drive 1050, and an input/output chip 1070 which are connected to the input/output controller 1084.

The host controller 1082 connects the RAM 1020, the CPU 1000 accessing the RAM 1020 at a high transfer rate, and the graphic controller 1075 to one another. The CPU 1000 is operated based on programs stored in the ROM 1010 and the RAM 1020 to control the respective units. The graphic controller 1075 obtains image data produced on a frame buffer provided in the RAM 1020 by the CPU 1000 and the like, and displays the image data on the display device 1080. Alternatively, the graphic controller 1075 may incorporate the frame buffer for storing the image data produced by the CPU 1000 and the like.

The input/output controller 1084 connects the host controller 1082, the communication interface 1030, the hard disk drive 1040, and the CD-ROM drive 1060, which are relatively high-speed input/output devices to one another. The communication interface 1030 communicates with other devices through a network. The hard disk drive 1040 stores programs and data to be used by the CPU 1000 in the computer 900. The CD-ROM drive 1060 reads programs or data out of a CD-ROM 1095 and provides the programs or the data to the hard disk drive 1040 through the RAM 1020.

Meanwhile, the ROM 1010, the FD drive 1050, and the input/output chip 1070 which are relatively low-speed input/output devices are connected to the input/output controller 1084. The ROM 1010 stores a boot program to be executed when starting the computer 900, programs depending on the hardware of the computer 900, and the like. The FD drive 1050 reads programs or data out of a flexible disk 1090 and provides the programs or the data to the hard disk drive 1040 through the RAM 1020. The input/output chip 1070 connects the FD drive 1050 and other various input/output devices through a parallel port, a serial port, a keyboard port, a mouse port, and the like, for example.

A program to be provided to the hard disk drive 1040 through the RAM 1020 is stored in a recording medium such as the flexible disk 1090, the CD-ROM 1095 or an IC card and is provided by a user. The program is read out of the recording medium and installed in the hard disk drive 1040 in the computer 900 through the RAM 1020, and is executed by the CPU 1000.

The program installed in the computer 900 for causing the computer 900 to function as the expression extraction device 10 includes a registered expression management module for managing the registered expression storage unit 100, an expression extraction module, a registered expression detection module, a polarity judgment module, a certainty management module for managing the certainty storage unit 135, a polarity determination module, a registered expression addition module, a registered expression deletion module, a loop processing module, and an evaluation display module. The program or the modules activate the CPU 1000 and the like, and thereby causes the computer 900 to function as the registered expression storage unit 100, the expression extraction unit 110, the registered expression detection unit 120, the polarity judgment unit 130, the certainty storage unit 135, the polarity determination unit 140, the registered expression addition unit 150, the registered expression deletion unit 155, the loop processing unit 160, and the evaluation display unit 170, respectively.

The above-described program or modules may be stored in an external recording medium. As the recording medium, in addition to the flexible disk 1090 and the CD-ROM 1095, it is possible to use an optical recording medium such as a DVD or a PD, a magneto-optical recording medium such as a MD, a tape medium, a semiconductor memory such as an IC card, and the like. Alternatively, it is also possible to use a storage device such as a hard disk or a RAM provided in a server system connected to a private communication network or the Internet as the recording medium, and to provide the program to the computer 900 through the network.

Although the present invention has been described by use of the preferred embodiment, it is to be noted that the technical scope of the present invention is not limited to the range described in the embodiment. It is obvious to those skilled in the art that various modifications and improvements are applicable to the embodiment. It is apparent from the definitions of the appended claims that such modifications and improvements can be also encompassed by the technical scope of the present invention.

According to the above-described embodiment, the expression extraction devices, the expression extracting method, the program, and the recording medium shown in the following claims are realized.

Although the preferred embodiment of the present invention has been described in detail, it should be understood that various changes, substitutions and alternations can be made therein without departing from spirit and scope of the inventions as defined by the appended claims.

What is claimed is:

1. An expression extraction device for extracting evaluation expressions from text having descriptions on evaluations of a specific evaluation target, each evaluation expression being an expression indicating the evaluation of the evaluation target, the expression extraction device comprising:
   a registered expression storage unit:
      registering an evaluation expression as a registered expression,
      associating a predetermined polarity with said registered expression, wherein a positive polarity represents a positive evaluation and a negative polarity represents a negative evaluation, said predetermined polarity being determined independent of a context or of technical terms of said evaluation expression;
   an expression extraction unit:
      extracting multiple evaluation expressions and a conjunction expression from the text, said coniunction expression, indicating a conjunctive relation between the evaluation expressions;
   a registered expression detection unit:
      receiving said multiple evaluation expressions and said conjunction expression;
      detecting from the received multiple evaluation expressions, an evaluation expression including the registered expression registered with the registered expression storage unit;
      associating the predetermined polarity of said registered expression with said evaluation expression including said registered expression;
   a polarity judgment unit:
      receiving said multiple evaluation expressions, said conjunction expression, and associated predetermined polarity;
      judging at least one of said multiple evaluation expressions, which is in conjunction with the evaluation expression including the registered expression by means of the conjunction expression in a form of ordinary conjunction, as being of the same polarity as the registered expression; and
      judging a series of evaluation expressions, which are not in conjunction with the evaluation expression including the registered expression by means of the conjunction expression in any form of the ordinary conjunction and adversative/concessive conjunction and also are not in conjunction with each other by the conjunction expression in any form of the ordinary conjunction and the adversative/concessive conjunction, as being of the same polarity as the registered expression, wherein evaluation expressions appearing in multiple positions in the text are individually judged to determine the polarities of the evaluation expression in their respective positions;

a registered expression addition unit:
  adding the evaluation expression having the polarity judged by the polarity judgment unit to the registered expression storage unit as a newly registered expression; and an evaluation display unit for displaying an evaluation of the evaluation expression based on the polarities of the multiple evaluation expressions.

2. The expression extraction device according to claim 1, wherein the polarity judgment unit further:
  judging an evaluation expression, which is in conjunction with the evaluation expression including the registered expression by means of the conjunction expression in a form of adversative/concessive conjunction as being of a polarity reverse of that of the registered expression, and
  judging a series of evaluation expressions, which are not in conjunction with the evaluation expression by means of the conjunction expression in any form of the ordinary conjunction and adversative/concessive conjunction and are not in conjunction with each other by the conjunction expression in any form of the ordinary conjunction and the adversative/concessive conjunction, as being of a polarity reverse of that of the registered expression.

3. The expression extraction device according to claim 1, further comprising:
  a loop processing unit for repeating processing by the registered expression detection unit and the polarity judgment unit based on the registered expression storage unit after addition of the newly registered expression by the registered expression addition unit.

4. The expression extraction device according to claim 1, further comprising:
  a registered expression deletion unit for deleting the registered expression from the registered expression storage unit when the evaluation expression having the polarity judged by the polarity judgment unit is registered with the registered expression storage unit as the registered expression and when the evaluation expression and the registered expression have mutually different polarities.

5. The expression extraction device according to claim 4, wherein the registered expression deletion unit deletes the registered expression from the registered expression storage unit when polarities of one of the evaluation expressions appearing in positions at a proportion equal to or higher than a predetermined proportion of multiple positions in the text are judged to be different from a polarity of the registered expression included in the one of the evaluation expressions registered with the registered expression storage unit.

6. The expression extraction device according to claim 1, wherein the expression extraction unit extracts at least a part of each of multiple sentences included in the text as each of the multiple evaluation expressions and extracts conjunctions added to the multiple sentences as the conjunction expression.

7. The expression extraction device according to claim 6, wherein the expression extraction unit extracts at least part of a sentence among the multiple sentences included in the text which does not satisfy a predetermined excluding condition as each of the multiple evaluation expressions.

8. The expression extraction device according to claim 6, wherein the expression extraction unit extracts a phrase constituting a main element of each of the multiple sentences included in the text as each of the multiple evaluation expressions and extracts conjunctions added to the multiple sentences as the conjunction expressions.

9. The expression extraction device according to claim 1, wherein the expression extraction unit extracts a main verb/adjective of each of multiple phrases constituting a sentence included in the text as each of the multiple evaluation expressions and extracts the conjunction expression inserted between the multiple phrases.

10. The expression extraction device according to claim 9, wherein the expression extraction unit extracts a conjunctive particle inserted between the multiple phrases as the conjunction expression.

11. The expression extraction device according to claim 9, wherein the expression extraction unit further extracts a pair of an evaluation item and an expression indicating an evaluation of the evaluation item as at least one of the multiple evaluation expressions.

12. The expression extraction device according to claim 11,
  wherein the expression extraction unit further extracts, as at least one of the multiple evaluation expressions, a pair of a verb/adjective indicating an evaluation of the evaluation item and its argument which indicates the evaluation item expressed as subject, object, or prepositional phrase.

13. The expression extraction device according to claim 11, further comprising:
  a polarity determination unit for determining a polarity of the verb/adjective, when polarities of the verb/adjective appearing in multiple positions in the text are judged as the same polarity at a proportion equal to or higher than a predetermined proportion, as equivalent to the polarity judged as identical at the proportion equal to or higher than the predetermined proportion.

14. The expression extraction device according to claim 9, wherein, when the polarities in the respective positions of the verb/adjective appearing in the multiple positions in the text are not judged to have the same polarity at the proportion equal to or higher than the predetermined proportion, the expression extraction unit further extracts a new evaluation expression composed of a pair of the verb/adjective and a noun qualified by the verb/adjective,
  the polarity judgment unit judges a polarity of the new evaluation expression, and
  when polarities of the new evaluation expression appearing in multiple positions in the text are judged as the same polarity at a proportion equal to or higher than the predetermined proportion, the polarity determination unit determines the polarity of the new evaluation expression as equivalent to the polarity judged as identical at the proportion equal to or higher than the predetermined proportion.

15. The expression extraction device according to claim 1, further comprising:
  a certainty storage unit for prestoring a certainty indicating a degree that the conjunction expression is the conjunction expression in any form of the ordinary conjunction or the adversative/concessive conjunction in terms of a type of the conjunction expression, wherein the polarity judgment unit further judges certainties of polarities of the evaluation expression in conjunction with the evaluation expression including the registered expression by means of the conjunction expression in any form of the ordinary conjunction, and of a series of the evaluation expressions, which are not in conjunction with the evaluation expression by means of the conjunction expression in any form of the ordinary conjunction and the adversative/concessive conjunction and are not in conjunction with each other by means of the conjunction expression in any form of the ordinary conjunction and the adversative/concessive conjunction, depending on the certainty of the ordinary conjunction expression, and the expression extraction device further comprises a polarity determination unit for determining a polarity of one of the evaluation expressions appearing in multiple positions in the text based on certainties of polarities in the respective positions.

16. An expression extracting method for extracting evaluation expressions from text having descriptions on evaluations of a specific evaluation target by use of a computer, each evaluation expression being an expression indicating an evaluation of the evaluation target, the expression extracting method comprising:

a registered expression storing step of:
  registering an evaluation expression including a predetermined polarity as a registered expression, the polarity being defined, not dependent upon on context or technical terms, as any of a positive polarity representing a positive evaluation and a negative polarity representing a negative evaluation;
an expression extracting step of:
  extracting multiple evaluation expressions and a conjunction expression from the text, said conjunction expression being an expression indicating a conjunctive relation between the evaluation expressions;
a registered expression detecting step of:
  detecting the evaluation expression including the registered expression from the multiple evaluation expressions;
  associating the predetermined polarity of said registered expression with the evaluation expression including the registered expression; and
a polarity judging step of:
  judging an evaluation expression, which is in conjunction with the evaluation expression including the registered expression by means of the conjunction expression as being the same polarity as the registered expression, and judging that a the series of evaluation expressions, which are not in conjunction with the evaluation expression by the conjunction expression in any form of the ordinary conjunction and adversative/concessive conjunction and are not in conjunction with one another by means of the conjunction expression in any form of the ordinary conjunction and the adversative/concessive conjunction as being the same polarity as the registered expression.

17. A program for extracting evaluation expressions from text having descriptions on evaluations of a specific evaluation target by use of a computer, each evaluation expression being an expression indicating an evaluation of the evaluation target, the program causing the computer to function as:

a registered expression storage unit for registering an evaluation expression including a predetermined polarity as a registered expression, the polarity being defined, not dependent upon context or technical terms, as any of a positive polarity representing a positive evaluation and a negative polarity representing a negative evaluation;

an expression extraction unit for extracting multiple evaluation expressions and a conjunction expression, which is an expression indicating a conjunctive relation between the evaluation expressions, from the text;

a registered expression detection unit for detecting which of said multiple evaluation expressions includes the registered expression registered with the registered expression storage unit; and a polarity judgment unit for judging an evaluation expression, which is in conjunction with the evaluation expression detected as including the registered expression by means of the conjunction expression in a form of ordinary conjunction, and further judging a series of evaluation expressions, which are not in conjunction with the evaluation expression by means of the conjunction expression in any form of the ordinary conjunction and adversative/concessive conjunction and are not in conjunction with each other by the conjunction expression in any form of the ordinary conjunction and the adversative/concessive conjunction, are of the same polarity as the registered expression wherein evaluation expressions appearing in multiple positions in the text are individually judged to determine the polarities of the evaluation expression in their respective positions.

18. A computer-readable recording medium recording the program according to claim 17.

* * * * *